W. BUTTLER.
GLASS REFRIGERATOR.
APPLICATION FILED MAY 12, 1913.
1,122,852.
Patented Dec. 29, 1914.
2 SHEETS—SHEET 1.
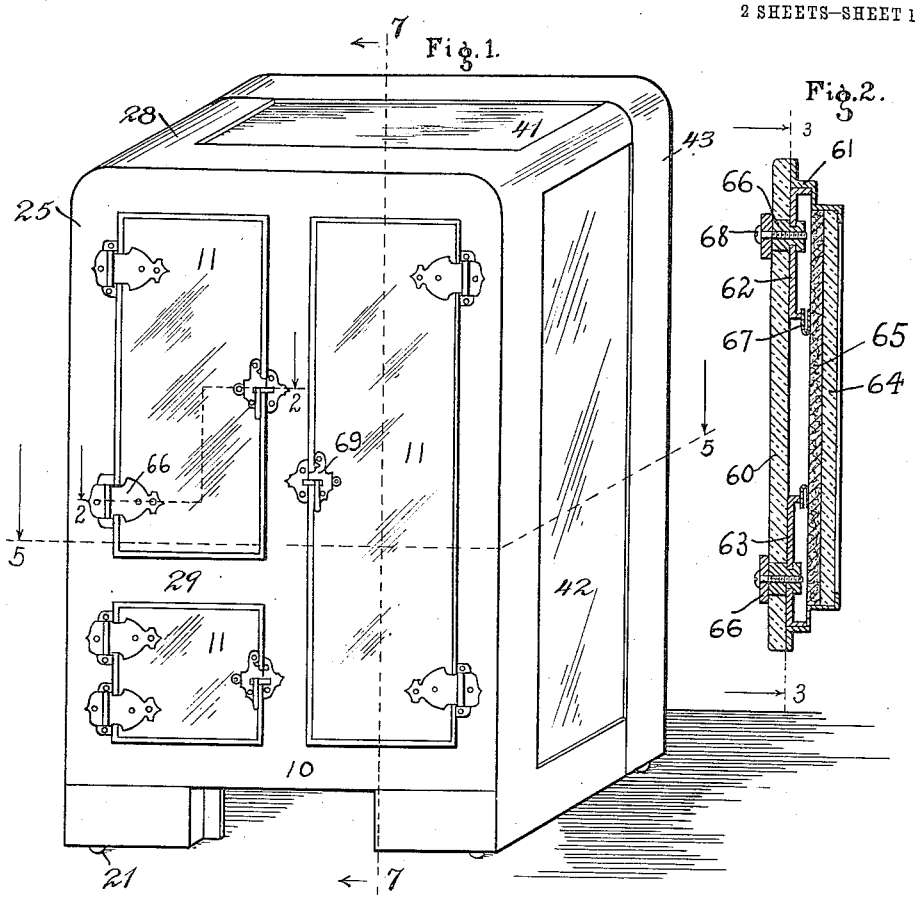
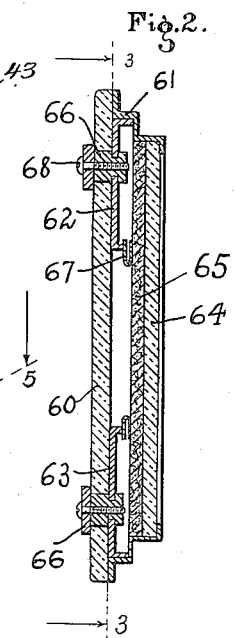
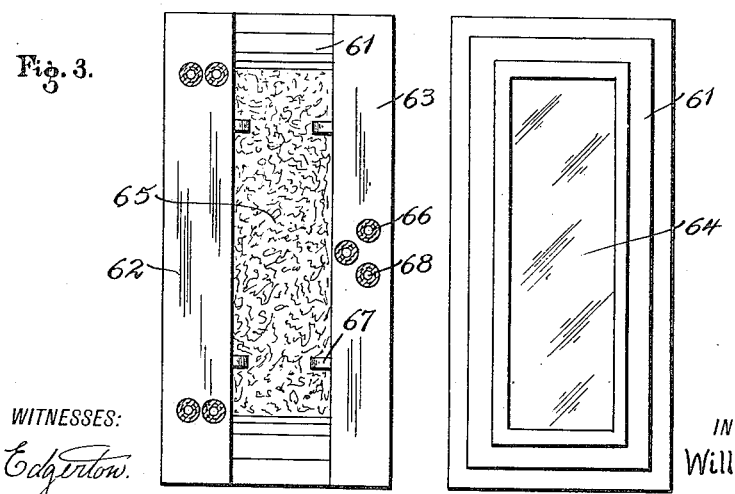
WITNESSES:
A. H. Edgerton.
J. A. Boyle.
INVENTOR
William Buttler
BY
ATTORNEY

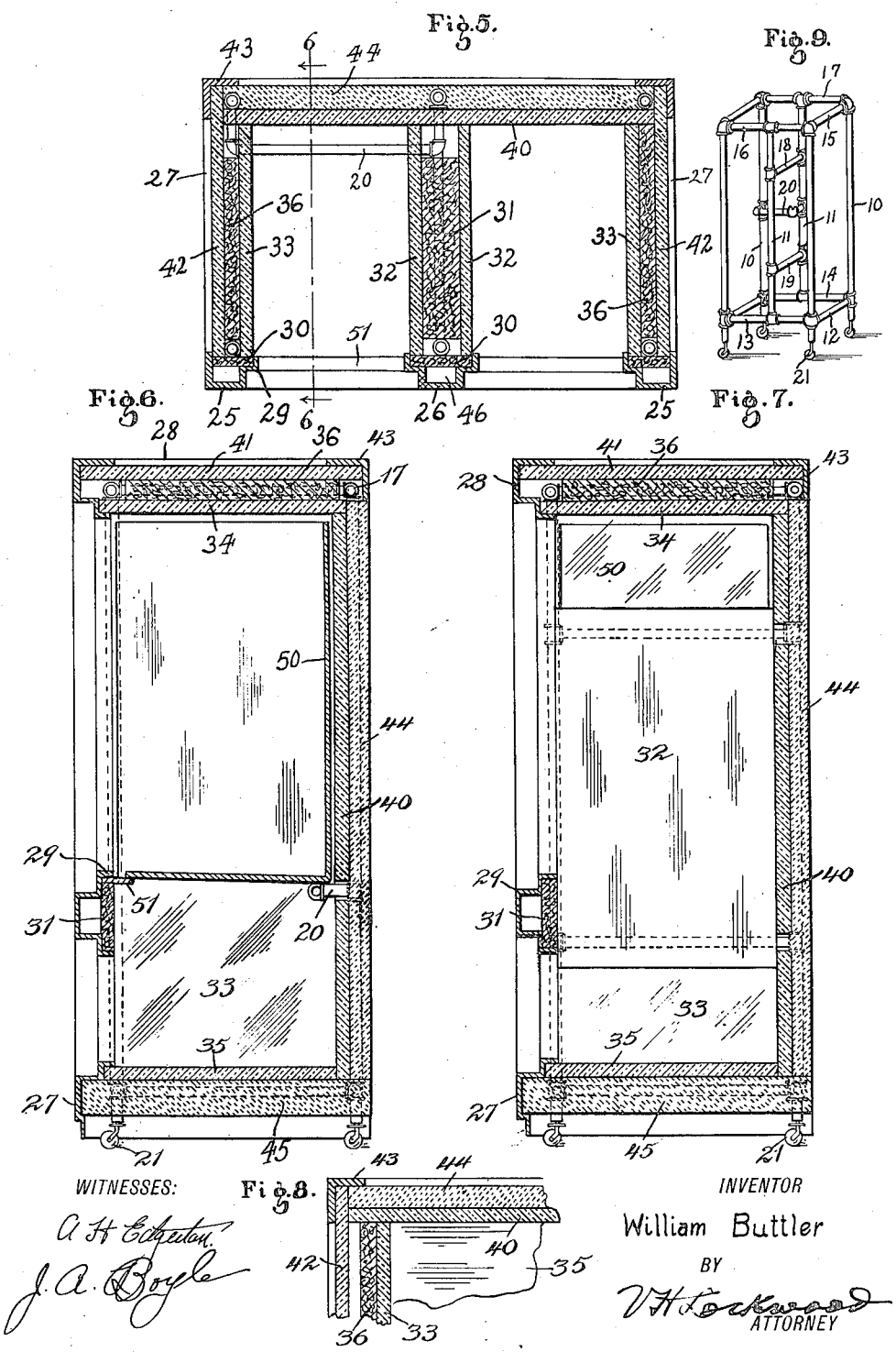

UNITED STATES PATENT OFFICE.

WILLIAM BUTTLER, OF INDIANAPOLIS, INDIANA.

GLASS REFRIGERATOR.

1,122,852.   Specification of Letters Patent.   Patented Dec. 29, 1914.

Application filed May 12, 1913.   Serial No. 767,069.

*To all whom it may concern:*

Be it known that I, WILLIAM BUTTLER, a citizen of the United States, and a resident of Indianapolis, county of Marion, and State of Indiana, have invented a certain new and useful Glass Refrigerator; and I do hereby declare that the following is a full, clear, and exact description thereof, reference being had to the accompanying drawings, in which like letters refer to like parts.

The object of this invention is to provide an improved construction of refrigerators and ice chests which is rendered sanitary by the use of glass in the construction thereof.

The chief feature consists in making the lining walls of the chambers of the refrigerator entirely with glass and in that connection the doors are lined with glass which renders the interior entirely sanitary. Likewise the external front, sides and top are made of glass and the rear external surface may be made of cement or of glass.

Another feature of the invention consists in the form and construction of the parts whereby the internal and external walls may be made of glass and the glass walls are lined with cork to exclude the heat and also to give a safe reinforcement or background for the glass plates, and chiefly to prevent sweating and injury to the refrigerator. There are also air chambers and a tubular metal frame which coöperates with the cork in preventing the sweating. Heretofore it has been impossible to make a combined metal and glass refrigerator which would retain its finished character because of the sweating and, therefore, injury of the metal and other parts. This is prevented by the cork and the air ventilation in the walls of the structure. The glass preferably used in such refrigerators is opaque or semi-transparent, being usually made of imitation of marble, onyx and the like.

The nature of the invention will be understood from the accompanying drawings and the following description and claims:

In the drawings, Figure 1 is a perspective view of the refrigerator from a position in front of it. Fig. 2 is a section on the line 2—2 of Fig. 1, through a door. Fig. 3 is a front elevation of the door with the outer glass plate removed. Fig. 4 is a rear elevation of the door. Fig. 5 is a horizontal section through the refrigerator on the line 5—5 of Fig. 1. Fig. 6 is a vertical transverse section through the refrigerator on the line 6—6 of Fig. 5. Fig. 7 is a section on the line 7—7 of Fig. 1. Fig. 8 is a portion similar to a section of one portion of the device showing a modified construction of Fig. 1. Fig. 9 is a perspective view of the tubular metal frame.

In the first place a tubular skeleton frame is formed substantially as shown in Fig. 9. In that tubular frame there are corner uprights 10, intermediate uprights 11, lower side members 12, a lower front member 13, a lower rear member 14, upper side members 15, front upper member 16 and rear upper member 17, an upper tube 18 connecting the uprights 11 and a lower tube 19 connecting the same, and a U-shaped tubular support 20 projecting inwardly from one of the corner uprights 10 to the rear upright 11 and about midway between the top and the bottom of the frame. Then a sheet metal skeleton frame is formed consisting of the hollow front upright portions 25 at the corners and an intermediate upright portion 26 between the doors and bottom edge portions 27, see Fig. 5, extending from front to rear, and top portions 28 extending from front to rear. This sheet metal skeleton frame is completed in all parts excepting at the back edge it is left incomplete until the device is assembled. Each of these hollow sheet metal frame members has lateral flanges and the portions thereof bordering on the door openings have stepped portions or shoulders 29.

In assembling, the sheet metal frame is placed on a table or support with the front downward, as shown in Fig. 5, and then a sheet of cork board 30 is placed in each hollow sheet metal member of the frame, as shown in Fig. 5, resting upon the steps or shoulders 29. There are three of these and after they are placed, the tubular metal frame, shown in Fig. 9, is placed within the sheet metal frame, the parts 18, 19 and 20, however, being omitted. In that position, the tubular frame rests upon the cork boards 30. Then the intermediate partition is put in place and it consists of a central cork board 31 with a glass plate 32 on each side thereof and glued thereto. The glass plates overlap the cork board and extend beyond the same at all points. Then glass plates 33 for lining the ends of the refrigerator are put in place and also the top and bottom glass plates 34 and 35. Each of the glass plates 33 and 34 has a cork board 36 glued thereto. Then the back glass plate 40 is put in place, being laid down upon the plates 32, 33 and 35 and abutting against the top plate 34. The back plate 40 is provided with holes through which the pipes 18, 19 and 20 are inserted after this plate 40 is put in place and they are secured then to the tubular frame. Then the outer top glass plate 41 and the outer end glass plates 42 are inserted, after which the rear portion 43 of the sheet metal frame is secured to the rest of the sheet metal frame in the position shown in Fig. 5. This rear sheet metal frame is a rectangular skeleton frame and is for the purpose of holding in place the tubular frame and the external glass plates. Then cement 44 is filled in upon the back plate 40 to the width permitted by the skeleton sheet metal frame, thus embedding portions of the tubular frame in the cement. Likewise, the bottom is filled with cement 45 similar to the back.

The foregoing constitutes the stationary portion or portions of the refrigerator and it is observed that there are air passages 46 through members of the sheet metal frame and around the cork boards and the tubes of the tubular frame so as to facilitate ventilation and removal of moisture and prevent the sweating of the device and particularly on the inner surface of the glass plate lining.

The central partition formed of the glass plates 32 and cork board 31 does not extend to the top or bottom of the refrigerator, as shown in Fig. 7, so that there is communication between the upper and lower ends of the chambers. The upper left-hand chamber is the ice chamber and, therefore, the cool air from the ice chamber can pass over the midway partition into the long upright chamber to the right and from it beneath said partition. There is also an ice box 50 placed in the upper left-hand chamber for holding ice and keeping it out of contact with the glass walls of said chamber. This is a sheet iron ice box open at the front end and at its lower end is supported on the U-shaped pipe 20, which is secured to two of the rear vertical pipes of the pipe frame, and the upper flange 51.

There are three doors shown for closing the openings in the front frame and they are all formed alike, substantially as shown in Fig. 2. Each door is formed of a glass front plate 60 with a rectangular stepped frame 61 lying upon the inner side thereof all around the edges and secured to the upper and lower cross plates 62 and 63. The stepped frame 61 has three steps on it, the outer plate 60 resting against the upper step and an inner glass plate 64 bearing against the inner step and a cork board 65 bearing against said inner glass plate and held against it by U-shaped springs 67 pressed between said cork board and inwardly turned flanges from the plates 62 and 63, as seen in Figs. 2 and 3. The plates 62 and 63 are used for securing the outer glass plate 60 and the hinges 66 in place. As seen in Fig. 2, the plates 62 and 63 each have a hole in them in which a metal block 66' is die casted so as to be fixed and the glass plate is provided with a hole snugly surrounding said block 66' and then the hinge 66 is secured to the block by a screw or bolt 68. This is a very permanent means for hinging the glass door to the main sheet metal frame. A fastener 69 is similarly secured to the glass plate 60 of the door. The strain does not come upon the glass plates in the door, but it is entirely sustained by the metal frame.

From the foregoing it is seen that this refrigerator is easily kept clean and is sanitary and is attractive at all times on account of the glass surface thereof which may be made to look like onyx or have other artistic colors.

The invention is:

1. A refrigerator or the like including walls formed of glass plates, filling between said plates, and a rigid metal frame for maintaining the walls in position, the members of said frame extending through the filling between the plates of glass.

2. A refrigerator or the like including walls formed of glass plates, filling between said plates, and a rigid metal frame for maintaining the walls in position, said metal frame being formed of pipes which extend through the filling between the plates of glass.

3. A refrigerator or the like including a rigid skeleton metal frame having angular corner strips, glass plates fitting in said angular corner strips for forming the external surfaces of the top and sides thereof, glass plates forming the inner walls of the chambers of said refrigerator, and a rigid frame formed of metal pipes extending through the structure between the plates.

4. A refrigerator or the like including a skeleton frame formed of metal pipes, glass plates for lining the chambers and forming the outer walls of the refrigerator, and pipes secured to said pipe frame and projecting through the glass plates lining the walls of the chambers for furnishing a support for anything placed within the chamber.

5. A refrigerator or the like including a metal frame between the inner and outer walls, walls with glass plate surfaces, and cork sheets between the glass plates and arranged to leave air chambers adjacent the metal frame and in communication with each other, whereby sweating of the metal will be prevented.

In witness whereof, I have hereunto affixed my signature in the presence of the witnesses herein named.

WILLIAM BUTTLER.

Witnesses:
J. H. WELLS,
O. M. McLAUGHLIN.